UNITED STATES PATENT OFFICE.

AUGUST HERMANN MIES, JR., OF BÜDESHEIM, AND ALBERT COBENZL, OF BINGEN, GERMANY.

SENSITIZED MATERIAL AND PROCESS OF MAKING SAME.

SPECIFICATION forming part of Letters Patent No. 713,474, dated November 11, 1902.

Application filed May 24, 1902. Serial No. 108,868. (No specimens.)

*To all whom it may concern:*

Be it known that we, AUGUST HERMANN MIES, Jr., a subject of the Grand Duke of Hesse-Darmstadt, residing at Büdesheim, Rhein-Hessen, and ALBERT COBENZL, a subject of the Emperor of Austria-Hungary, residing at Bingen-on-the-Rhine, Germany, have invented certain new and useful Improvements in Sensitized Materials and Processes of Making Same; and we do hereby declare the following to be a full, clear, and exact description of the invention, such as will enable others skilled in the art to which it appertains to make and use the same.

In order to produce photographs on fabrics, it is old to treat the latter previously with an extract of Iceland moss, then to dry it, and next to sensitize it in the usual manner. Photographs produced on fabrics thus treated have, however, the disadvantage that after a time they show spots, although they are durable and washable, because the sensitive film or layer has not the disadvantages of those made with the usual binding materials. For instance, it is not soluble in water, as is gelatin, nor brittle, as are films of collodion or rosin, and not easily decomposable, as is albumen.

It has long been desirable to replace Iceland moss with a material having all its advantages and none of its disadvantages. Attempts in this direction have revealed the fact that natural or artificial soluble starch represents, if pure, a binding material which fulfils all the desired conditions, such starch having, as is well known, the peculiar property that after being well dried it is insoluble even in hot water and fully resistant to the usual washing materials, as soap. As the lichenin in Iceland moss represents a natural soluble starch which, as has been shown, has this special valuable property and when pure acts like an artificially-prepared soluble starch, the property exhibited by Iceland moss is explained. The advantages come from the lichenin and the disadvantages from the cetraric acid and other substances, which decompose silver salts.

The novelty of our herein-described invention consists in the fact that the desired effect is obtained, not only by the lichenin contained in Iceland moss, but also by other kinds of natural soluble starch and by artificial soluble starch.

The novel technical effect of the herein-described invention is based on the hitherto unknown use of pure soluble starch, by which the disadvantages inseparable from the use of Iceland moss are eliminated.

In the practical application of the invention any natural or artificial soluble starch is suitable which has the property of becoming insoluble after thoroughly drying, preferably at a high temperature—e. g., 100° centigrade and more. For this purpose one very available substance is the artificial soluble starch of commerce, which is made from the starch of potatoes, wheat, maize, rice, &c., by the action of diluted acids containing free chlorin of glycerin, &c., and possesses the desired qualities.

Of the natural soluble starches there can be used inulin, lichenin, isolichen, &c., as all these possess the above-mentioned desirable qualities. By the use of solutions of these starches durable and permanently-spotless photographs can be made not only on fabrics of all kinds, especially velvet, and on furs, (with which gummy substances cannot be used,) but also on wood, veneers, leather, &c.

The textile or other substance may be treated—e. g., with a solution of fifty parts, by weight, of soluble starch in two thousand five hundred of water—with a suitable amount of a chlorin salt, next thoroughly dried at 100° centigrade and sensitized with a solution of silver nitrate, and then again thoroughly dried.

Having thus described our invention, what we claim, and desire to secure by Letters Patent, is—

1. The process herein described of making sensitized photographic material, which consists in impregnating a base with a solution of soluble starch, subsequently drying the impregnated base to render the starch insoluble, and finally giving a sensitized surface to the dried starch-impregnated base.

2. The product herein described, comprising photographic sensitized material having a base impregnated with insoluble starch.

3. The process, herein described, of preparing fabrics to receive photographs; which consists in impregnating said fabrics with a solution of soluble starch, next rendering the said starch insoluble, and finally sensitizing said insoluble starch.

4. The process, herein described, of preparing materials to receive photographs; which consists in impregnating said materials with soluble starch, drying said starch and subjecting the same to a predetermined temperature, thereby rendering said starch insoluble, and then sensitizing said starch thus treated.

5. The product herein described; consisting of a material permeated with insoluble sensitized starch.

In testimony that we claim the foregoing as our invention we have signed our names in presence of two subscribing witnesses.

AUGUST HERMANN MIES, JUNR.
ALBERT COBENZL.

Witnesses to August Hermann Mies, Jr.:
MAX ARBLISH,
HENRY HASPER.
Witnesses to Albert Cobenzl:
EDUARD MIES,
WALTER HAUSING.